United States Patent [19]

Pruden et al.

[11] Patent Number: 4,979,208
[45] Date of Patent: Dec. 18, 1990

[54] METHOD AND APPARATUS FOR ELECTRONIC PAYPHONE OPEN SWITCH INTERVAL MANAGEMENT

[75] Inventors: Benny J. Pruden, Brownstown; Howard Wisnik, Norristown; Scott Hudis, West Chester, all of Pa.

[73] Assignee: Mars Incorporated, McLean, Va.

[21] Appl. No.: 213,223

[22] Filed: Jun. 28, 1988

[51] Int. Cl.$^5$ ............... H04M 17/02; H04M 19/00
[52] U.S. Cl. .................................. 379/145; 379/146
[58] Field of Search ............................ 379/145, 146

[56] References Cited

U.S. PATENT DOCUMENTS

| | | | |
|---|---|---|---|
| 3,428,751 | 2/1969 | Edington | 379/145 |
| 4,031,325 | 6/1977 | Dudonis et al. | 379/145 |
| 4,039,768 | 8/1977 | O'Maley | 379/146 |
| 4,046,962 | 9/1977 | Rogers | 319/146 |
| 4,074,079 | 2/1978 | Prell et al. | 379/145 |
| 4,326,103 | 4/1982 | Oehrig | 379/146 |
| 4,361,731 | 11/1982 | Smoot | 379/146 |
| 4,567,325 | 1/1986 | Crouch et al. | 379/145 |
| 4,625,078 | 11/1986 | Crouch et al. | 379/145 |
| 4,674,114 | 6/1987 | Crouch et al. | 379/145 |
| 4,742,536 | 5/1988 | Dewenter et al. | 379/97 |
| 4,768,217 | 8/1988 | Asano et al. | 379/32 |
| 4,768,223 | 8/1988 | Kinoshita et al. | 379/143 |
| 4,926,458 | 5/1990 | Reger et al. | 379/146 |

Primary Examiner—Stafford D. Schreyer
Attorney, Agent, or Firm—Davis, Hoxie, Faithfull & Hapgood

[57] ABSTRACT

Control apparatus for a line operated telephone is described. This control circuitry is designed to be primarily telephone line powered and to not employ a large capacitor for storing power to sustain the circuitry during open switch intervals in which the telephone line is not powered. Rather, the present circuitry includes a telephone line monitoring circuit for sensing a power down condition, a processing means such as a microprocessor with an associated power down program for storing process status at a time just prior to power down and for resetting the processing at the appropriate place upon power up, and low power state monitoring latches for monitoring important events, such as an on hook condition, coin collection and refund operations occurring during an open switch interval. In combination, a low power operation is achieved primarily utilizing a regularly interrupted source, the phone lines, and requiring only small battery to power the low power monitoring state monitoring latches.

32 Claims, 7 Drawing Sheets

PROGRAM DESIGN LANGUAGE FOR SAVING MTC 100 SYSTEM
STATUS DURING OPEN SERVICE INTERVALS AND RESTORING
SYSTEM STATUS ON POWER UP.

IF POWER FAIL DETECTED                (LINE CURRENT DROPS BELOW THRESHOLD)
DISABLE THE COIN MECH
ENERGIZE THE "A" RELAY                (ALLOWS CENTRAL OFFICE TO CHECK
                                      FOR COIN PRESENCE)
CHECK FOR ANY CHANGED INPUTS          (ELIMINATES MISSING A PENDING CHANGED
                                      INPUT)
SAVE IMAGE OF HARDWARE STATUS         (IMAGE = INTERNAL COPY OF ACTUAL
                                      HARDWARE STATUS)

HARDWARE OUTPUTS

MICROPHONE GAIN STATUS
MICROPHONE MUTE STATUS
FILTER STATUS
DISPLAY REGISTER SELECT STATUS
HARD DISABLE OF THE "A" RELAY

HARD DISABLE OF THE "TOTALIZER" RELAY
HARD DISABLE OF THE RINGER RELAY
HARD DISABLE OF THE "TEST" RELAY
HARD DISABLE OF THE SERVICE DISPLAY
2200 hz FILTER STATUS

HARD DISABLE OF THE HOOK SWITCH RELAY
DTMF DECODER STATUS

HARDWARE INPUTS

48 VOLT DETECT STATUS
SPEECH CHIP POWER DOWN STATUS
SPEECH / MUTE STATUS

STATUS OF THE FOLLOWING SOFTWARE INTERNAL VARIABLES:

IN SERVICE MODE
IN SERVICE MODE TEST CALL
ABOVE / NOT ABOVE INITIAL RATE

TASK STACK POINTER
STATUS OF PARALLEL MATRIX SWITCHES

FIG.7A

```
ELSEIF POWER UP DETECTED (INTERRUPT LEVEL)

CLEAR INTERNAL MEMORY
MICROPROCESSOR INITIALIZATION
INITIALIZE THE HARDWARE PORTS
SETUP THE PROGRAM STATUS WORD
SETUP THE STACK POINTER
SETUP THE INTERRUPT PRIORITIES
SETUP THE TIMERS
IF CHECK SEQUENCE INVALID
INITIALIZE NON VOLATILE MEMORY
(INCLUDES INITIALIZATION OF SAVED HARDWARE IMAGES & SOFTWARE)
ENDIF
RESTORE HARDWARE IMAGES FROM NON VOLATILE MEMORY

SETUP THE HARDWARE
RESTORE SELECTED SOFTWARE VARIABLES FROM NON VOLATILE MEMORY

NOTE THAT POWER UP OCCURED
BEGIN RUNNING THE SOFTWARE EXECUTIVE CODE
ENDIF
```

---

```
IF POWER UP DETECTED          (APPLICATIONS LEVEL)
IF MODE OF OPERATION  =  OPERATE
 CHECK/PROCESS ANY STORED EVENT :  HOOKSWITCH
                                   COLLECT
                                   REFUND

UPDATE THE ACCOUNTABILITY DATA BASE
CLEAR OPERATE MODE VARIABLES

ELSEIF MODE OF OPERATION = MODEM
IF MODEM CALL IN PROGRESS
POWER UP MODEM
RESUME CALL
ELSE
 CHECK INPUTS, ESTABLISH APPROPRIATE MODEM CALL
ENDIF

ELSE MODE OF OPERATION = SERVICE
IF TEST CALL IN PROGRESS
 DISPLAY TEST CALL MESSAGE
 RESUME TEST CALL
ELSE
 INITIALIZE SERVICE MODE
ENDIF
```

METHOD AND APPARATUS FOR ELECTRONIC PAYPHONE OPEN SWITCH INTERVAL MANAGEMENT

FIELD OF THE INVENTION

This invention relates to control apparatus for line operated telephones. More particularly, this invention relates to a low power control apparatus for a coin operated telephone which primarily draws its power for operation from the phone lines even though line power is typically removed during a number of events in the course of a typical payphone call.

BACKGROUND OF THE INVENTION

Coin operated telephone stations are interfaced with a central office by a two wire loop circuit When the handset is lifted off the hook, the central office supplies a very small DC loop current, typically 23 mA minimum, which is available to the coin operated telephone for use as a source of power. This source of power, however, is interrupted during a number of events in the course of a typical payphone call.

It is important for a local station such as a payphone to be able to operate in spite of such power interruptions or open switch intervals ("OSI"). Where alternate sources of power are not available, it is critical to be able to operate from the line power even though that power will be interrupted several times during each call.

In the past, line powered phones have used large capacitors to provide a supply of stored power which is used to power control electronics during open switch intervals. In one such phone, an approximately 100,000 microfarad (uF) storage capacitor is employed.

The open switch intervals vary according to the control switching system in use at the central office. For older switching systems, open switch intervals are typically 350 milliseconds (ms) but under certain conditions can extend up to 600 ms. In fact, under worst case conditions, such intervals have been measured to last as long as 4 seconds.

To address these OSI conditions, large capacitors, sometimes called super caps have been employed. Usage of large capacitors, however, may result in a number of unsatisfactory effects. For example, in order to initially charge large capacitors from the phone lines, many seconds are required. Consequently, if the large capacitor is not sufficiently charged when the payphone customer picks up the receiver, an initial dial tone will be delayed until the capacitor is adequately charged. The delayed dial tone is a source of confusion to the customer and may result in lost sales if the user assumes the phone is dead and hangs up because no dial tone is immediately heard. To try to avoid this problem, one phone employing a large capacitor trickle charges that capacitor while the phone is on hook. On hook, this phone draws about 1.6 milliamperes (mA) to charge its capacitor. While this arrangement allows the capacitor to be fully charged when the phone is taken off hook, thereby eliminating the delayed dial tone, it violates certain existing on hook current specifications which limit the on hook current to a maximum of approximately 1 microampere (uA). Besides not meeting these specification, an arrangement requiring a relatively large on hook current at some point becomes impractical, as the current available from the central station which provides the line power is limited.

SUMMARY OF THE INVENTION

It is therefore an object of the present invention to provide an apparatus for successfully operating in the face of open switch intervals without requiring large capacitors.

It is a further object of the present invention to operate using only line power during off hook conditions when an open switch condition is not occurring, and no line power during on hook conditions During off hook operation with an open switch condition occurring, only a very small amount of internal battery power is employed for such operations as monitoring the status of significant events during the open switch condition.

As more fully described below, the present invention provides a low power control apparatus for coin operated telephones or any other line powered telephone. This low power control utilizes a relatively small battery for a limited range of functions. For all other functions, the present control apparatus utilizes solely phone line power to power its various operations even though that line power is subject to interruption as a result of open switch intervals due to central office switching.

In order to operate without employing a large capacitor and without drawing a trickle charge while on hook, and to still utilize primarily phone line power, a number of novel low power circuits have been devised as more fully described below.

DETAILED DESCRIPTION

Figure 1:
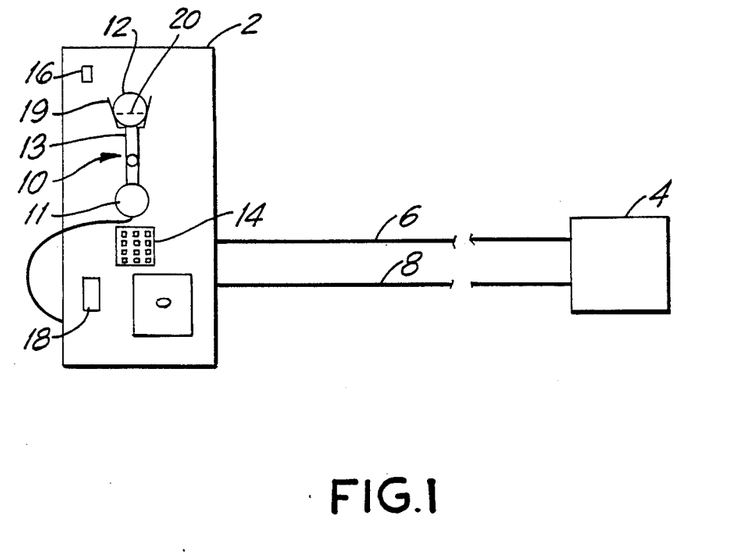
FIG. 1 illustrates a coin operated telephone connected to a central office by a two wire loop circuit.

FIG. 1 shows a coin operated phone 2 which is connected to a central office 4 by two wires, the phone lines, which are referred to as the tip 6 and ring 8 lines. As shown in FIG. 1, phone 2 includes a handset 10 having a mouthpiece 11 and an earpiece 12, which are connected by a handle 13. The phone 2 also includes a keypad 14, a coin slot 16, and a coin return slot 18. When not in use by a customer, the handset 10 sits in a cradle 19 depressing a spring loaded switch 20, the hook switch. When the handset 10 is in the position shown in FIG. 1, hook switch 20 and phone 2 are then in their "on hook" position. When handset 10 is lifted out of cradle 19, hook switch 20 is no longer depressed, and hook switch 20 and phone 2 are then in their "off hook" position. As is well known and will be briefly discussed in conjunction with the discussion of FIG. 2 below, the central office 4 applies various D.C. voltage amplitudes and polarities on the tip 6 and ring 8 relative to one another or to ground as the case may be, from which the phone 2 generates it operational power when handset 10 is off hook. As has been previously described in U.S. application Ser. No. 199,129 filed on May 26, 1988 and assigned to the assignee of the present invention, the varying DC voltages and AC ringing voltage are interpreted by the phone 2 as providing operational commands for controlling its operation. U.S. application Ser. No. 199,129, filed on May 26, 1988 is incorporated by reference herein.

When handset 10 is on hook, the phone 2 draws no power from the tip 6 or ring 8. The phone 2 does, however, perform status monitoring in its standby state using a small amount of power from a relatively small internal battery.

To originate a call, a customer picks up handset 10 thereby releasing the hook switch 20 from its depressed position. The phone 2 enters its off hook state, and begins to draw power from the tip 6 and ring 8 to process the call. Next, the customer inserts a sufficient number of coins into the coin slot 16 to cover the cost of the call and dials the number he wishes to call using keypad 14. The dialed number is transmitted to central office 4 which connects the call. The customer's money is collected by phone 2 when a collect signal from the central office 4 is received. The customer completes his call and then hangs up.

Figure 2:
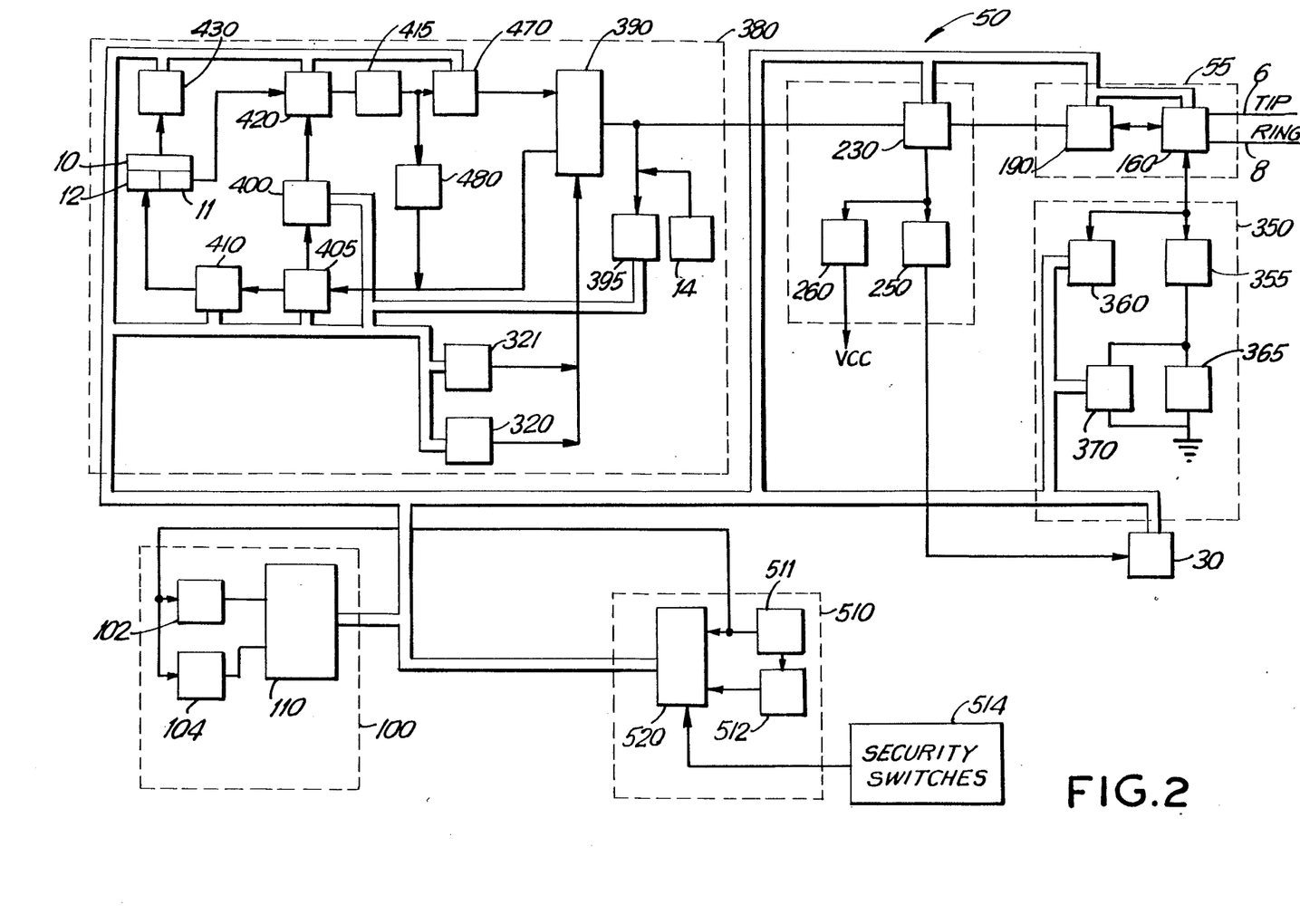
FIG. 2, is a block diagram of a low power control in accordance with a preferred embodiment of the present invention.

Referring to FIG. 2 of the drawings, a block diagram of a low power control circuit 50 is illustrated A line interface circuit 55 comprising a ground lifting relay circuit 160 and an off hook detector circuit 190 connects the tip 6 and ring 8 lines from the central office 4 to a power supply circuit 230. The ground lifting relay circuit 160 also serves to selectively connect the tip and ring lines 6 and 8 to a coin totalizer control circuit 350 comprising a totalizer relay circuit 355, a coin supervisor detector circuit 360, a coin relay circuit 365 and a first coin bypass circuit 370. The interconnection of a coin acceptor 30 which is responsible for accepting and validating coins deposited in coin slot 16 of FIG. 1 is also represented in FIG. 2 The coin acceptor 30 directs accepted coins to a standard coin telephone escrow bucket (not shown). This escrow bucket holds the coins in escrow until completion of the time period for which the coins were deposited and then collects them based on commands from the central office 4 and resulting control signals produced by totalizer control circuit 350. Coin acceptor 30 provides output signals to processing element 100 and in return receives operational control inputs from the processing element 100. Processing element 100 is shown in FIG. 2 as comprising a real time clock 102, memory 104 and a microcontroller 110.

Returning to the power supply circuit 230, that circuit is shown in FIG. 2 as having outputs connected to a gate solenoid power circuit 250, a DC power supply circuit 260, and an audio network 380. More specifically, power supply 230 provides power to a standard DTMF keypad which is presently preferred for use as the keypad 14 of FIG. 1, a DTMF decode circuit 395 and a speech network 390. With the exception of the limited functions powered from battery 511 which is part of a monitor system 510, the power supply circuit 230 in conjunction with control signals from processing element 100 controls the provision of all power for the low power controller 50. Power for operating a coin routing gate for controlling the routing of coins within the coin acceptor 30 is provided through power supply 230, to the gate solenoid power supply 250, and from there to the coin routing gate. Power for all the digital electronic components requiring a DC supply is provided through supply 230 to the DC power supply 260. When the audio network 380 is powered up, it provides the phone 2 with the capability of transmitting and receiving speech and audio tone signals. These signals are transmitted and received as AC voltages on the tip 6 and ring 8 which are offset by the DC voltage applied by the central office 4. The processing element 100 through its single microcontroller 110 controls all the operations of phone 2 including audio network 380, coin acceptor 30, and power supply 230. Microcontroller 110 also records the status of the phone 2 and has the capability of initiating communications during the standby mode if that status warrants it.

Audio network 380 comprises a large number of interconnected blocks under the control of microcontroller 110. More specifically, the speech network 390 is connected to the DTMF decode circuit 395 and the DTMF keypad 14. Further, the speech network 390 is also connected to a coin tone generator 320, a DTMF generator 321, an audio balance circuit 480, a first switch 405, and notch filter circuit 470. The DTMF decode circuit 395, the coin tone generator 320 and the DTMF generator 321 are in turn connected to a modem circuit 400. Modem circuit 400 is also connected to the first switch 405 and a second switch 420. The notch filter circuit 470 is connected through a low pass filter (LPF) circuit 415 to the second switch 420. The second switch 420 is also connected to a microphone in the mouthpiece 11 which is part of the handset 10. First switch 405 is connected to a level adjust circuit 410 which is in turn connected to an ear piece 12 which is part of the handset 10. Handset 10 is further connected to a handset detector circuit 430 The DTMF decode circuit 395, the coin tone generator 320, the DTMF generator 321, the modem 400, the first and second switches 405 and 420, the level adjust 410, the handset detector 430, and the notch filter circuit 470 are all further connected to microcontroller 110 and the monitor system 510.

As its name implies, the monitor system 510 monitors the status of the phone 2. Typically monitor system 510 draws its power from power supply 230 which is energized by power from the tip 6 and ring 8 lines when the handset 10 is off hook. Consequently, normal operational power for monitor circuit 520 is provided from the phone line.

Having now introduced the various blocks of low power controller 50, the cooperation of those blocks to the extent relevant to the present invention will be discussed below following a brief discussion of how open switch intervals arise as a result of the control switching occurring in a typical Bell System central office.

Figure 3:
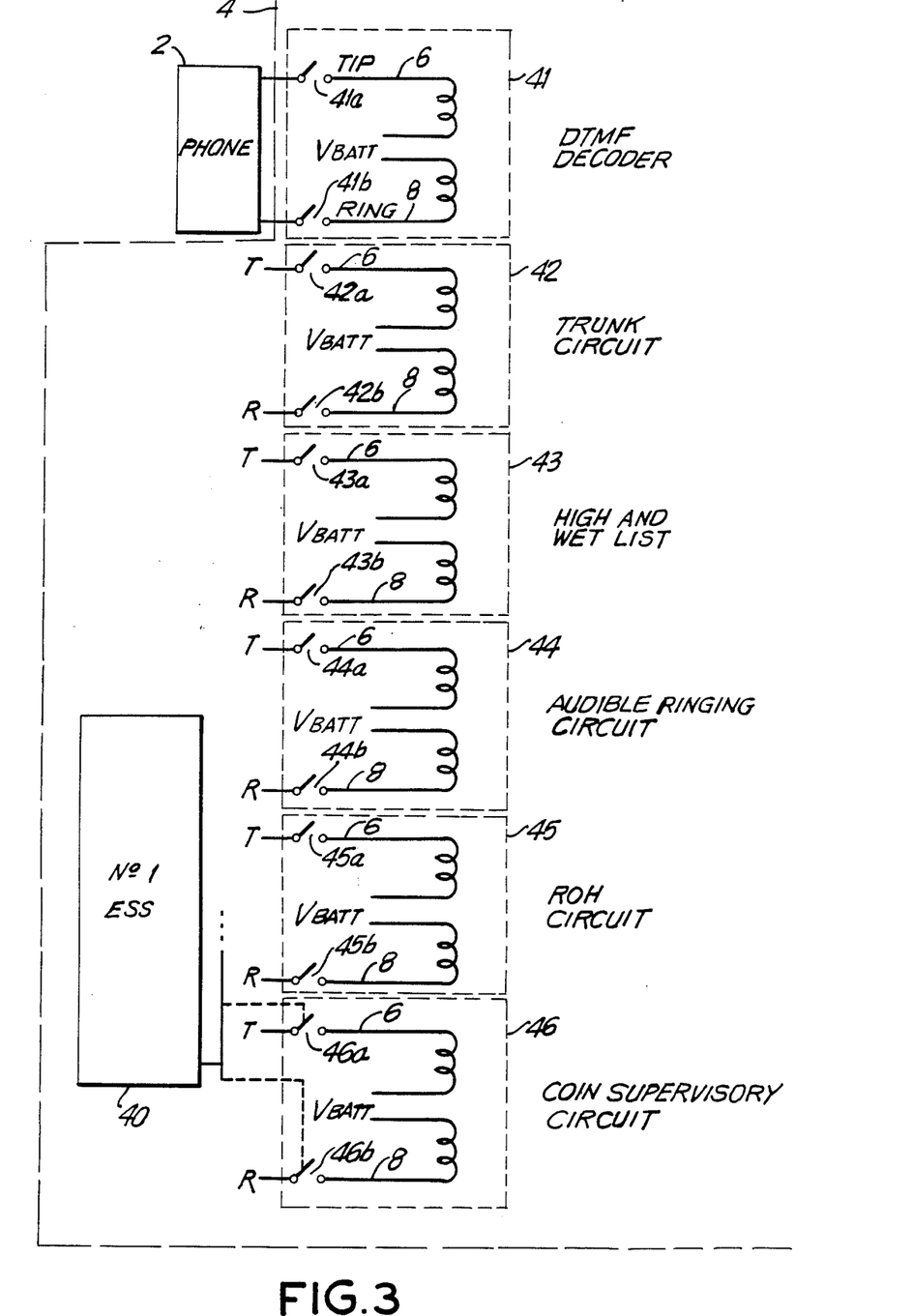
FIG. 3 illustrates in block form a variety of supply circuits controllably connected to the coin operated telephone of FIG. 1 by an electronic control office switching circuit.

Turning to FIG. 3 of the drawings, the phone 2 is again shown as in FIG. 1 connected to the central office 4 by tip and ring lines 6 and 8 respectively. In FIG. 3, however, the central office 4 is shown in greater detail in order to illustrate how open switch intervals occur and why no or insufficient power is available to phone 2 on the tip and ring lines 6 and 8 during OSI.

The central office 4 includes a switching control 40, such as the No. 1 ESS (Electronic Switching System) manufactured by Western Electric. Switching control 40 controllably switches the tip and ring lines 6 and 8 so that a plurality of different function control supply modules can be connected one at a time to the tip and ring lines 6 and 8 at the appropriate times. Each supply module connects a bank of batteries $V_{BATT}$ through its own voltage adjusting circuitry to the tip and ring lines when that module is switched into operation by switching control 40. By way of example, FIG. 3 shows a DTMF decoder supply module 41, a trunk supply module 42, a high and wet list supply module 43, an audible ringing supply module 44, an off hook ringing supply module 45 and a coin supervisory supply module 46 which are all controllably switched by switching control 40 at appropriate times. Each of the supply modules 41-46 includes a respective pair of switches 41a, 41b; 42a, 42b; 43a, 43b; 44a, 44b; 45a, 45b; and 46a, 46b. These switches are controlled by the switching control 40 to control which one of the supply modules 41-46 is connected to the tip and ring lines 6 and 8. Consequently, the DC voltage supplied to the phone 2 is controlled by whatever supply module is connected at that time "Break before make" switching is used to control the switching from one supply module to another. This means that one module is disconnected before the next module is connected. Consequently, each time a module is switched, there is an interruption of the DC voltage connected to the phone 2 during the interval in which a first module is disconnected and before a second module is connected.

For a typical call from a payphone, such as phone 2, open switch intervals may occur as follows. After the receiver 13 is taken off the hook, an open switch interval will follow. Then, the DTMF decoder supply module 41 is switched in by the switching control 40 in order to allow the customer to dial the digits of the number he desires to reach. An open switch interval follows the disconnection of the DTMF decoder supply module 41 until the coin supervisory supply module 46 is switched in to determine if an adequate amount of money has been inserted. Another open switch interval also precedes the switching of the audible ringing supply module 44 which causes the call to ring through. An open switch interval precedes connection of the trunk supply module 42 which allows voice communication once the called party has answered the call. Further open switch intervals precede collect and refund coin signals supplied by the coin supervisory control module 46. Finally, the user hangs up at the completion of the call.

Other coin operated telephone related open switch intervals occur whenever an operator comes on line, and whenever coin collect, coin return, coin present test or initial rate test operations are performed. These operations are multiple switched events, that have OSI associated with them. Each time the phone 2 is connected to the coin supervisory supply module 46, or disconnected from the coin supervisory supply module 46 there is an open switch interval.

While the above discussion does not illustrate all the possible ways in which an open switch interval can arise, it both illustrates the frequency with which such intervals may occur in a typical call, and the magnitude of the problem addressed by the present invention. Open switch intervals also occur on the phone lines connected to the telephones of ordinary consumers. Consequently, while the present invention is directed to solving the problems faced in a coin operated telephone environment where it is highly desirable to operate utilizing line power as the primary source of power, the principles of the present invention are applicable to any phones which are primarily line powered.

In order to address the OSI problem, it is necessary to detect open switch intervals, power down the bulk of the control circuitry during each such interval, maintain in memory the state of processing of the control circuitry at the time processing is interrupted by an open switch interval so that processing can later resume at the proper point, it is necessary to monitor using very small amounts of power, changes of conditions during OSI which are deemed to be particularly important, and finally, it is further necessary to be able to properly process the above information.

In the present invention a number of events are monitored even in the on hook condition through the use of battery operated electronic latches Specifically, the state of the hook switch 20, as well as the occurrences of a collect or a refund operation are monitored These conditions are particularly important since if they occur during an open switch interval, phone 2 is expected to reset differently than if they had not occurred.

Figure 5:
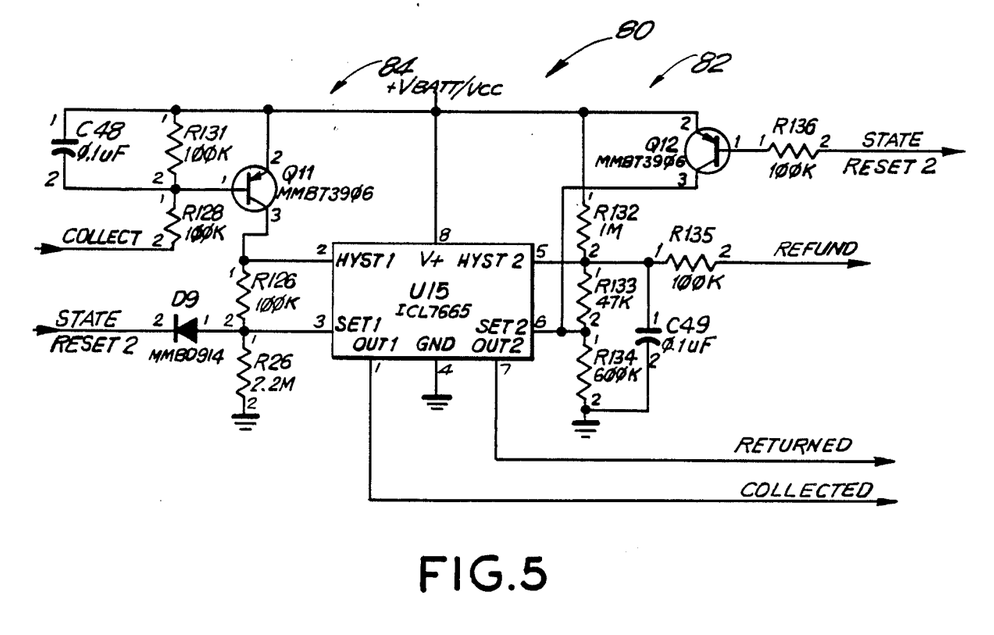
FIG. 5 is a schematic diagram of collect and refund latch circuits.
Figure 6:
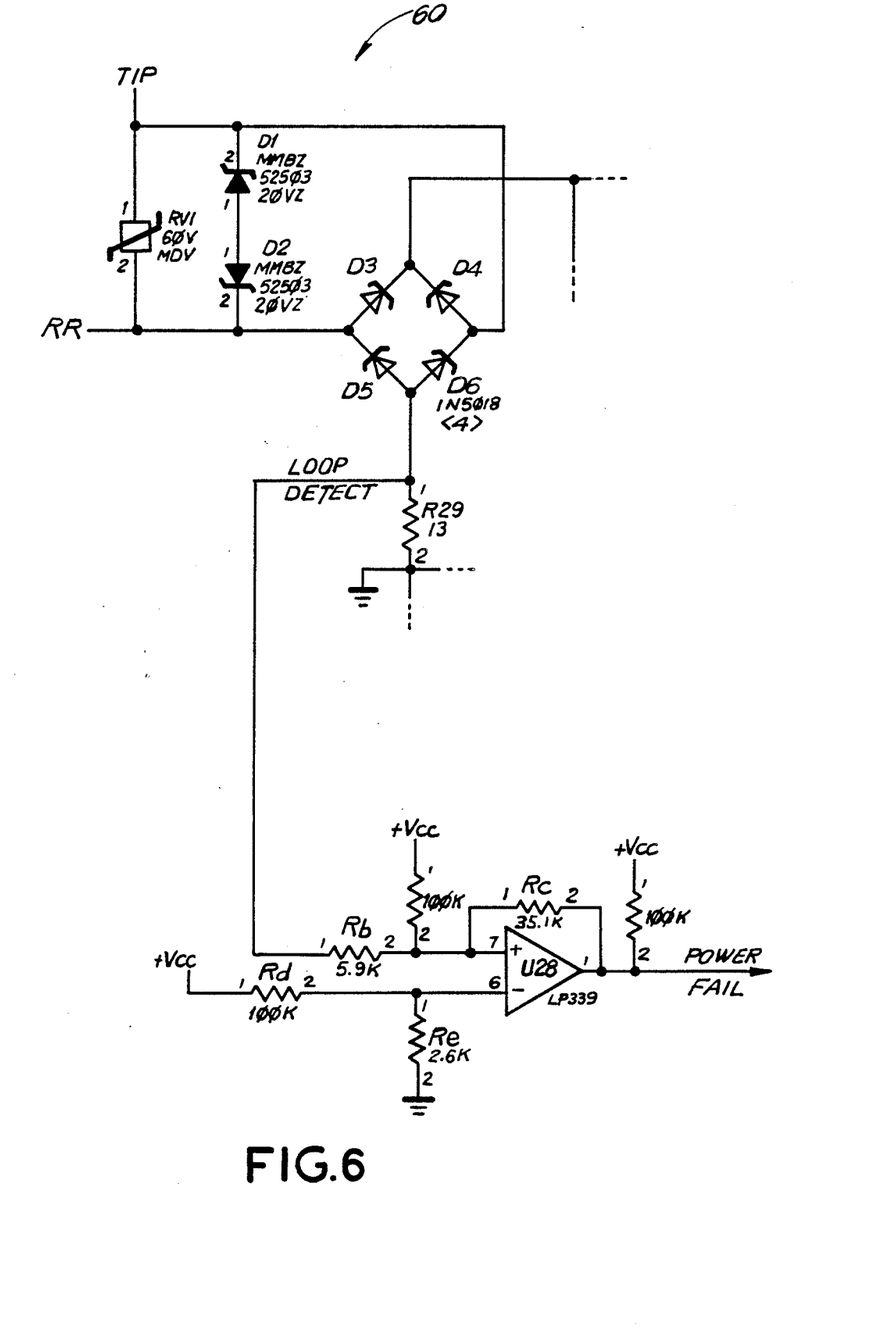
FIG. 6 is a schematic diagram of a line power monitor circuit.

In the presently preferred embodiment, open switch intervals are detected by a line monitoring circuit 60 shown in FIG. 6. This circuit 60 gives the microcontroller 110 warning that the power has been removed and a minimum amount of time (typically about 200 ms for a control circuit in accordance with the preferred embodiment of the present invention) remains to prepare for power down. This 200 ms power down time is a result of a relatively small capacitor (1000 uF) in the power supply circuit 230. The system then proceeds to save its present status along with the state of the key hardware outputs in nonvolatile memory 104. When the open switch interval is over and power is returned to the tip and ring lines, the microcontroller 110 comes out of its reset condition and recreates its pre-OSI status by recalling the stored status information from memory. Additionally, battery powered latches 70 and 80 (FIGS. 4 & 5) are checked to determine if the switch hook 20 returned to the on hook position or if the collect or refund signals indicate that either of these conditions has occurred during the OSI. The appropriate actions are then taken by microcontroller 110.

Using smart power down logic coupled with the step of saving status information for important events during power down assures that the phone is correctly reset to the state it was in upon power down and that status changes during the open switch interval are appropriately handled This control arrangement is capable of correct operation regardless of the length of time the open switch interval lasts, or the phase of the call the OSI occurs in. Further, this control arrangement only requires a small power storing capacitor to provide adequate power for the system to save the status information in nonvolatile memory.

Figure 4:
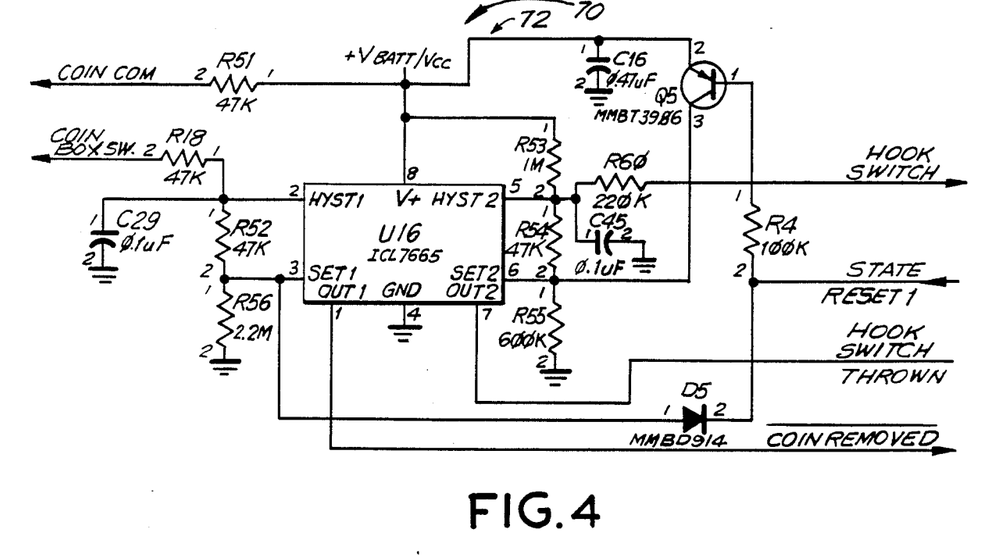
FIG. 4 is a schematic diagram of a hook switch latch circuit.

Referring to FIG. 4, a presently preferred hook switch latch circuit 72 is shown. The hook switch latch circuit 72 is part of battery powered latch 70 which includes two latch circuits. The central part of latch 70 is latch U16, which is a CMOS circuit supplied by a battery $V_{batt}$. The latch U16 also serves to monitor a coin box switch which is not shown. The coin box switch monitors the coin box, and its details are well known and not part of the present invention.

In its ready state, the voltages at the HYST2 and SET2 inputs of latch U16 are determined by resistors R53, R54 and R55. Latch U16 operates in a manner to switch its output OUT2 low (approximately 0 volts) if the HYST2 input is below the SET2 input. The output OUT2 remains low until the SET2 input is raised to the battery level $V_{batt}$.

In the event the switch hook 20 is changed to the on hook condition, the signal on the Hook Switch line goes low thus pulling the HYST2 input low as that input is connected through resistor R60 to the Hook Switch line. This low at the HYST2 input causes the OUT2 output of latch U16 to go low thus storing an indication that the switch 20 has been closed. In other words, latch U16 stores the information that the phone has been hung up during an OSI. When power is returned after the OSI, the output OUT2 is monitored to determine if the switch hook 20 was on hook or not during the open switch interval If it was, then the microcontroller 110 causes the STATE RESET 1 line to go low, turning "on" transistor Q5 through base resistor R4. When transistor Q5 is on, the SET2 input of latch U16 is raised to essentially $V_{batt}$. This input voltage resets the latch U16 and brings the output OUT2 high again so that latch U16 is ready to detect a change of state during the next OSI.

FIG. 5 shows a refund latch circuit 82 which works exactly as the hook switch circuit 72 described above except that it is triggered by a refund signal indicative of the occurrence of a refund operation. FIG. 5 also shows a collect circuit 84 which works similar to the hook switch and refund latches 72 and 82 except that the HYST1, SET1 signals for collect circuit 84 are the reverse sense a the HYST2 and SET2 signals. That is, the output OUT1 signal is brought low when HYST1 is brought to essentially $V_{batt}$ and the OUT1 signal is reset when the SET1 signal is brought essentially to 0 volts (low). When a collect signal is applied on a COLLECT line connected through resistor R12 to the base of transistor Q11, the transistor Q11 is turned on thereby bringing the HYST1 input high (i.e., to $V_{batt}$) thus causing output OUT1 to go low. The state reset signal from the microcontroller 110 on STATE RESET 2 line brings the SET1 input signal low (approximately 0 volts) to reset output OUT1 of latch U15 when the microcontroller 110 returns from the open switch interval. Both of the latches U15 and U16 described above are packages containing two latches in the package.

While several preferred battery-powered latch circuits are shown in FIGS. 4 and 5 and described above, it should be recognized that additional such latches may be designed to monitor any other condition deemed particularly worthy of monitoring during an open switch interval.

FIG. 6 illustrates a presently preferred line power monitoring circuit 60. The current through the line (tip to ring) is measured through a resistor R29. If the current falls below a predetermined threshold determined by resistors Rb, Rc, Rd and Re, then the output of comparator U28 changes level indicating the power loss condition. The output signal from comparator U28 is connected to the microcontroller 110 which responds by initiating its power down sequence.

Figure 7A:
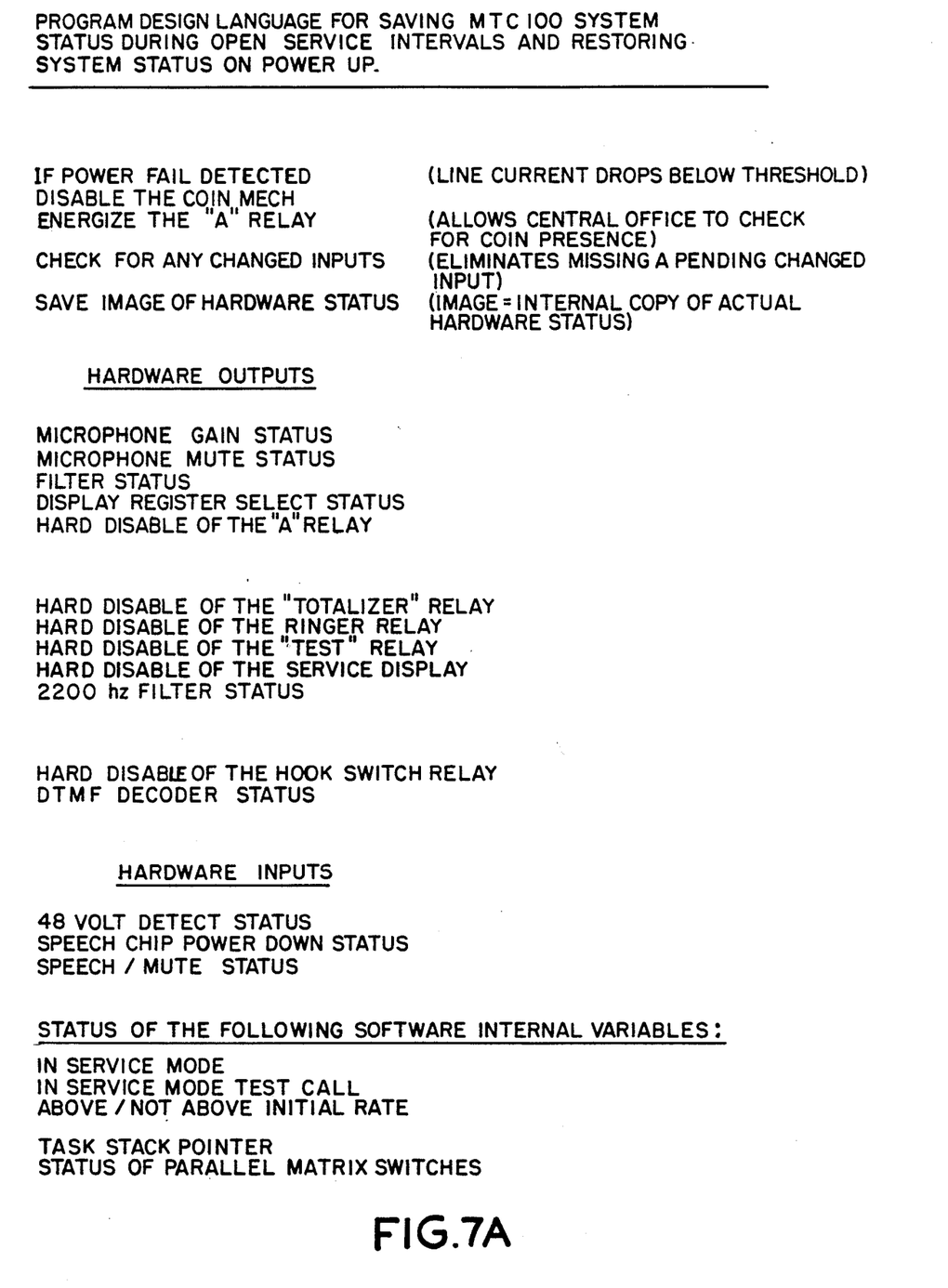
FIGS. 7A and 7B comprise a program design language description of power down and reset logic.
Figure 7B:
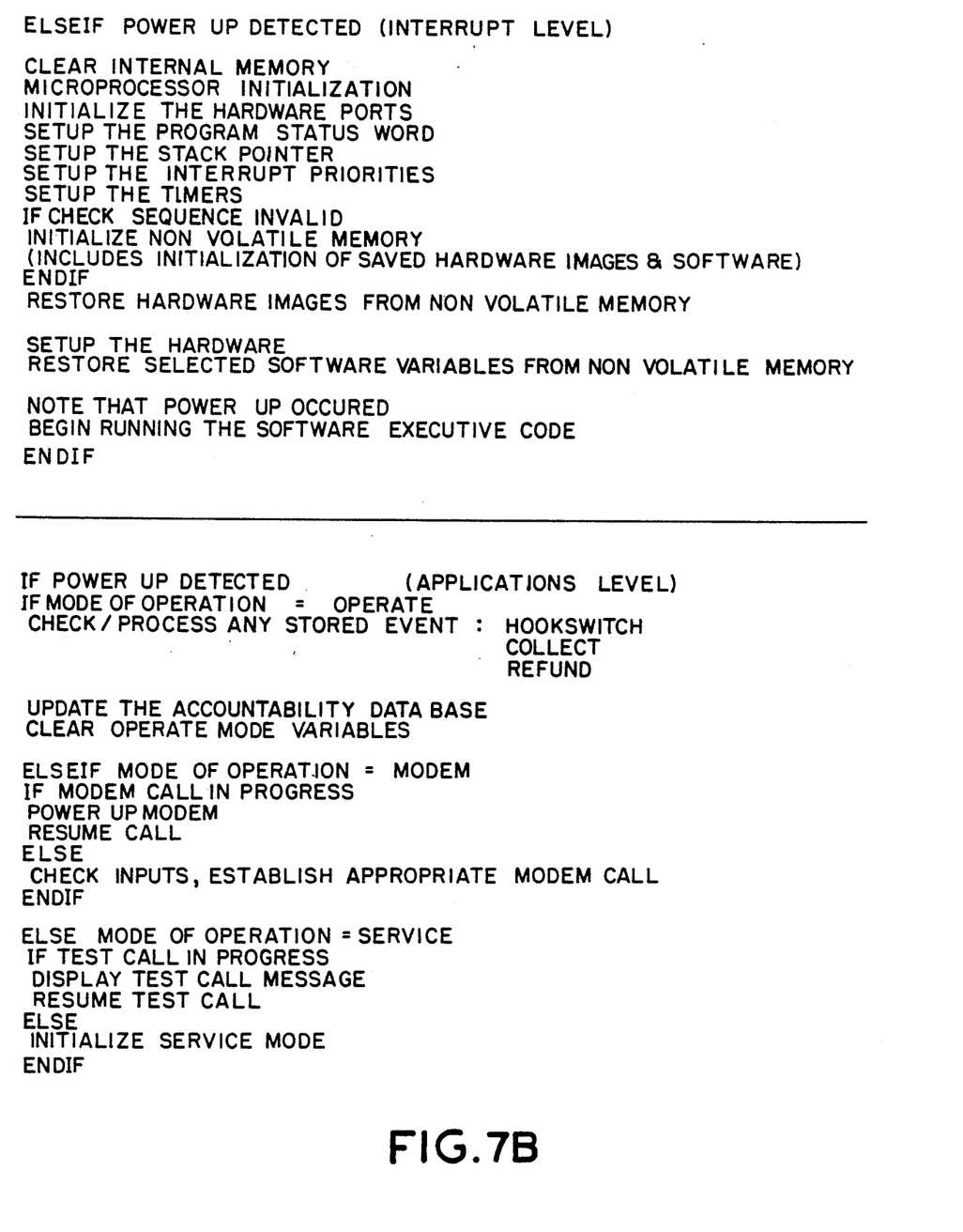

The presently preferred power down sequence is shown in FIGS. 7A and 7B in a Program Design Language description which is written for the 80C31 microprocessor. Actual software used to implement the logic of FIGS. 7A and 7B is attached as Appendix A.

When microcontroller 110 of FIG. 2 is programmed according to FIGS. 7A and 7B, the following steps occur when loop power is interrupted. Upon detection of loop power interruption by the line monitoring circuit 60 of FIG. 6, a "Power Fail" signal is generated. This signal indicates that line current has dropped below a predetermined threshold. Once a Power Fail condition is detected, microcontroller 110 disables the coin mechanism 30 and energizes the "A" relay. This step allows central office 4 to check for coil presence. The next step in the power down sequence is that microcontroller 110 checks for any changed inputs which eliminates the possibility of missing a pending changed input.

Next, microcontroller 110 saves an image of hardware status. This image is an internal copy of the actual hardware status at the time of power down. The hardware outputs checked for their status at power down include: microphone gain status, microphone mute status, filter status, display register select status, hard disable of the "A" relay, hard disable of the "Totalizer" relay, hard disable of the ringer relay, hard disiable of the "Test" relay, hard disable of the service display, 2200 Hz filter status, hard disable of the hook switch relay, and DTMF decoder status. Hardware inputs are checked as follows: 48 volt detect status, speech chip power down status and speech/mute status. Finally, the status of the following software internal variables is also checked: the in service mode, in service mode test call, above/not above initial rate, task stack pointer, and status of parallel matrix switches. The status of each of the above hardware outputs, hardware inputs and software internal variables, is checked immediately following the time the Power Fail condition is detected, and is saved in nonvolatile memory 104 which receives power from battery 511 when the power interruption exceeds the approximately 200 ms of power down time provided by the small capacitor in the power supply circuit 230.

At the step ELSEIF shown in FIG. 7B, power up is detected. A microprocessor interrupt is generated and the microcontroller 110 performs the following stages. First, it clears the internal memory and proceeds to follow an initialization routine in which it initializes the hardware ports, sets up the program status word, sets up the stack pointer, sets up the interrupt priorities, and sets up the timers.

A Check sequence is then performed. If that sequence is determined to be invalid, the nonvolatile memory containing the saved hardware image and software internal variables, is initialized.

If the Check sequence is determined to be valid, then the hardware images from nonvolatile memory are restored in internal memory, the hardware is setup, and the selected software variable from nonvolatile memory are restored to internal memory.

At this point, it is noted that power up has occurred and the microprocessor begins running the software executive code and recommences processing the call at the point at which it was interrupted.

As part of this resumption of processing, the microcontroller 110 checks the status of battery powered latches 70 and 80 (FIGS. 4 and 5) to determine if they indicate that an event, such as Hookswitch, Collect, or Refund, occurred during the time the micrcontroller 110 was powering down or reset as a result of line power interruption. It is also determined whether a modem call or a test call was in progress at the time of power interruption, and if so, such calls are resumed at the appropriate point.

We claim:

1. A method of controlling the operation of a phone line powered coin operated telephone comprising the steps of:
   monitoring an occurrence of an open switch interval;
   initiating upon the detection of an open switch interval a power down sequence for a control processing means comprising a micrcontroller, said control processing means controlling the operation of the coin operated telephone;
   storing hardware and software status information in nonvolatile memory during the power down sequence following detection of the open switch interval to store a status of the control processing means at the time of the open switch interval;
   employing at least one battery powered low power consuming latch circuit to monitor for the entire duration of the open switch interval, information concerning at least one condition subject to change during the open switch interval; and
   initiating upon detection of the end of the open switch interval a power up sequence for resuming processing by the control processing means by returning the control processing means to said status at the time of the open switch interval, and by taking into account any information monitored during the open switch interval.

2. The method of claim 1 wherein one condition subject to change which is monitored is a change in status of a hook switch of the coin operated telephone.

3. The method of claim 1 wherein one condition subject to change which is monitored is an occurrence of a coin collection operation.

4. The method of claim 1 wherein one condition subject to change which is monitored is an occurrence of a coin refund operation.

5. The method of claim 1 wherein a plurality of battery powered low power consuming latch circuits are employed to monitor information concerning a plurality of conditions subject to change during the open switch interval.

6. The method of claim 5 wherein the conditions subject to change comprise a change in status of a hook switch of the coin operated telephone, an occurrence of a coin collection operation and an occurrence of a coin refund operation.

7. An apparatus for controlling the operation of a phone line powered coin operated telephone comprising:
   status monitoring means for monitoring an occurrence of an open switch interval and the return of power after the occurrence of an open switch interval;
   nonvolatile memory for storing a set of status information indicative of status of the coin operated telephone at the time of the occurrence of an open switch interval;
   at least one battery powered low power consuming latch circuit for monitoring at least one condition subject to change during the occurrence of an open switch interval and having an output indicative of said at least one condition;
   a control processing means for controlling operation of the coin operated telephone, said control processing means comprising a microcontroller connected tot he status monitoring means, the nonvolatile memory and the output of the battery powered low power consuming latch;
   means for initiating a power down sequence for the control processing means upon detection of the occurrence of an open switch interval;
   means for storing said set of status information in the nonvolatile memory when the occurrence f an open switch interval is detected by said status monitoring means; and
   means for initiating a sequence for resuming processing by the control processing means, said resuming of processing taking into account said set of status information and the output of said at least one battery powered latch.

8. The method of claim 1 further comprising the step of completing the power down sequence by putting the microcontroller in a reset condition.

9. The method of claim 1 further comprising the step of monitoring the status of the phone line for the occurrence of an open switch interval and for the end of the open switch interval with a line power monitoring circuit.

10. The method of claim 9 further comprising the step of warning the control processing means that the phone line power has been removed and that a minimum amount of time remains to initiate the power down sequence.

11. The method of claim 10 wherein the amount of time to initiate the power down sequence is approximately 200 milliseconds.

12. The method of claim 9 further comprising the step of informing the control processing means that power has been returned so that the power up sequence will be initiated.

13. The method of claim 5 further comprising the step of employing at least one battery powered latch to monitor a condition subject to change when the telephone is on hook.

14. The method of claim 5 further comprising the step of utilizing the plurality of battery powered latches to monitor information concerning a plurality of conditions subject to change during the power down sequence.

15. The apparatus of claim 7 further comprising means for resetting the microcontroller upon completion of the power down sequence.

16. The apparatus of claim 7 wherein the status monitoring means comprises a line power monitor circuit.

17. The apparatus of claim 7 wherein the control processing means further comprises a real time clock.

18. The apparatus of claim 7 wherein said at least one condition is the status of a hook switch of the coin operated telephone.

19. The apparatus of claim 7 wherein said at least one condition is the occurrence of a coin collection operation.

20. The apparatus of claim 7 wherein at least one condition is the occurrence of a coin refund operation.

21. The apparatus of claim 7 wherein a plurality of battery powered latch circuits monitor a plurality of events that are subject to change during an open switch interval.

22. The apparatus of claim 21 where the plurality of events subject to change include the status of the hook switch, the occurrence of a coin collection operation, and the occurrence of a coin refund operation.

23. The apparatus of claim 7 wherein no phone line power is drawn by the telephone when the telephone is on-hook.

24. A method of continuing a phone call with a phone line powered telephone after phone line power has been interrupted as a result of an open switch interval for a time exceeding a power down sequence of a control processing means for controlling the operation of the telephone, comprising the following steps:
  monitoring the occurrence of the open switch interval;
  initiating a power down sequence upon detection of a beginning of the open switch interval;
  storing coin operated telephone status information in nonvolatile memory;
  initiating a power up sequence upon detection of an end of the open switch interval; and
  retrieving and utilizing the coin operated telephone status information stored in nonvolatile memory to resume the phone call at the point at which phone line power was interrupted.

25. The method of claim 24 further comprising the step of:
  monitoring at least one condition subject to change during the open switch interval.

26. The method of claim 25 further comprising the step of:
  storing an indication that said at least one condition subject to change has changed during the open switch interval.

27. The method of claim 26 further comprising the step of:
  utilizing said indication to resume the phone call taking into consideration that said at least one condition subject to change has changed.

28. Apparatus for continuing a phone call with a phone line powered telephone after phone line power has been interrupted as a result of an open switch interval for a time exceeding a power down sequence of a control processing means for controlling the operation of the coin operated telephone, comprising:
  means for monitoring the occurrence of the open switch interval;
  means for initiating a power down sequence upon detection of a beginning of the open switch interval;
  means for storing coin operated telephone status information in nonvolatile memory;
  means for initiating a power up sequence upon detection of an end of the open switch interval; and
  means for retrieving and utilizing the coin operated telephone status information stored in nonvolatile memory to resume the phone call at the point at which phone line power was interrupted.

29. The apparatus of claim 28 further comprising:
  means for monitoring at least one condition subject to change during the open switch interval.

30. The apparatus of claim 29 further comprising:
  means for storing an indication that said at least one condition subject to change has changed during the open switch interval.

31. The method of claim 30 further comprising:
  means for utilizing said indication to resume the phone call taking into consideration said t least one condition subject to change has changed.

32. Apparatus for continuing a phone call with a phone line powered telephone after phone line power has been interrupted as a result of an open switch interval for a time exceeding a power down sequence of a control processor for controlling the operation of the telephone, comprising:
  an opening switch interval detection circuit having an output indicating the beginning of an open switch interval;
  a programmed microcontroller connected to the output of the open switch interval detection circuit, said microcontroller initiating a power down sequence upon the occurrence of the output indicating the beginning of an open switch interval;
  a nonvolatile memory connected to the micrcontroller;
  a phone status monitoring circuit having an output connected to the microcontroller;
  said microcontroller causing the output from the phone status monitoring circuit to be stored in nonvolatile memory as part of the power down sequence;
  said microcontroller also causing at least one software interval variable to be stored in nonvolatile memory as part of the power down sequence; and
  said microcontroller upon detection of an end of the open switch interval causing a power up sequence which includes the steps of retrieving the output from the phone status monitoring circuit and said at least one software internal variable stored in nonvolatile memory and initializing said microcontroller for resumed processing with the retrieved output and software internal variable from nonvolatile memory.

* * * * *

UNITED STATES PATENT AND TRADEMARK OFFICE
CERTIFICATE OF CORRECTION

PATENT NO. : 4,979,208
DATED : December 18, 1990
INVENTOR(S) : Pruden et al.

It is certified that error appears in the above—identified patent and that said Letters Patent is hereby corrected as shown below:

```
Column 1, line 18, insert --.-- after "circuit".
Column 1, line 67, delete "specification" and insert --specifications--.
Column 2, line 12, insert --.-- following "conditions".
Column 2, line 35, delete "," following "2".
Column 3, line 30, insert --.-- following "illustrated".
Column 3, line 42, insert --.-- after the number "2".
Column 4, line 37, insert --.-- following "430".
Column 5, line 20, insert --.-- following "time".
Column 6, line 49, insert --.-- following "handled".
Column 7, line 15, insert --.-- following "interval".
Column 7, line 30, delete "a" and insert --as--.
Column 8, line 6, delete "coil" and insert --coin--.
Column 8, line 18, delete "disiable" and insert --disable--.
Column 8, line 62, delete "micrcontroller" and insert --microcontroller--.
```

UNITED STATES PATENT AND TRADEMARK OFFICE
CERTIFICATE OF CORRECTION

PATENT NO. : 4,979,208

DATED : December 18, 1990

INVENTOR(S) : Pruden et al

It is certified that error appears in the above-identified patent and that said Letters Patent is hereby corrected as shown below:

In the Claims:

Claim 7, column 9, line 66 delete "tot he" and insert --to the--.
Claim 7, column 10, line 5 delete "f" and insert --of--.
Claim 31, column 12, line 12 delete "t" and insert --at--.

Signed and Sealed this

Twenty-third Day of June, 1992

Attest:

DOUGLAS B. COMER

*Attesting Officer*  *Acting Commissioner of Patents and Trademarks*